United States Patent [19]

Grangeon et al.

[11] Patent Number: 5,240,612
[45] Date of Patent: Aug. 31, 1993

[54] FILTRATION OF LIQUID MEDIA UNDER CONDITIONS OF NON-STEADY TANGENTIAL FLOW

[75] Inventors: André Grangeon, Valreas; Jeanine Lenoir, Chaponost; Robert Pellissier, Marseille, all of France

[73] Assignee: Techsep, Courbevoie, France

[21] Appl. No.: 834,828

[22] Filed: Feb. 13, 1992

[30] Foreign Application Priority Data

Feb. 13, 1991 [FR] France .................. 91 01655

[51] Int. Cl.$^5$ .................. B01D 65/02; B01D 65/08
[52] U.S. Cl. .................. 210/636; 137/876; 210/321.69; 210/321.89; 210/456; 210/650; 95/46; 96/6
[58] Field of Search ........ 210/321.69, 321.78, 210/321.87, 323.2, 416.1, 456, 636, 650, 321.65, 321.88, 321.89, 418, 332, 791; 55/16, 18, 158; 137/625.31, 625.46, 876

[56] References Cited

U.S. PATENT DOCUMENTS

| | | | |
|---|---|---|---|
| 3,648,754 | 3/1972 | Sephton | 210/321.89 |
| 4,632,756 | 12/1986 | Coplan et al. | 210/321.88 |
| 4,990,526 | 2/1991 | Schmidt | 210/321.69 |
| 4,995,977 | 2/1991 | Hilgendorff et al. | 210/321.69 |
| 5,105,851 | 4/1992 | Fogelman | 137/625.46 |
| 5,120,445 | 6/1992 | Colman | 210/456 |
| 5,132,015 | 7/1992 | Down | 210/321.65 |

FOREIGN PATENT DOCUMENTS

| | | | |
|---|---|---|---|
| 2563443 | 10/1985 | France . | |
| 7515264 | 12/1975 | Netherlands | 210/636 |
| 9100135 | 1/1991 | PCT Int'l Appl. . | |

Primary Examiner—Joseph W. Drodge
Attorney, Agent, or Firm—Burns, Doane, Swecker & Mathis

[57] ABSTRACT

Filterable liquid media are continuously filtered by circulating same in a closed circulation loop, to and tangentially through a filtration module provided therealong which confines at least one filtration membrane, e.g., a microfiltration, ultrafiltration or reverse osmosis membrane, and which includes a permeate outlet, and by adjusting the flowrate but not the driving pressure of circulating liquid medium, notably by means of an apertured and perforated rotating disc, as to establish a non-steady periodic pseudophysiological flow thereof, at least over the working face surfaces of the at least one membrane.

15 Claims, 4 Drawing Sheets

FILTRATION OF LIQUID MEDIA UNDER CONDITIONS OF NON-STEADY TANGENTIAL FLOW

BACKGROUND OF THE INVENTION

1. Field of the Invention

The present invention relates to the filtration of filterable liquid media under conditions of non-steady tangential flow for purposes of liquidmedium separation operations, especially filtration, microfiltration, ultrafiltration or reverse osmosis.

2. Description of the Prior Art

It is known to this art to conduct filtration operations underconditions of tangential flow with a view to separating the constituents of a liquid medium by reason of, in particular, their size, their shape and their physical characteristics, utilizing pressure as the driving force.

According to this technique, the liquid medium to be treated is circulated tangentially over one of the face surfaces of a planar or tubular organic or inorganic porous membrane having particular adapted porosity.

Under the influence of a pressure differential between the two face surfaces of the membrane, at least one of the constituents of the fluid is selectively transported through the membrane. This liquid fraction thus recovered is designated the permeate. The remainder of the liquid is designated the retentate.

These organic or inorganic membranes typically comprise, on the one hand, a porous support, the principal function of which is to impart mechanical properties to the overall membrane and, on the other, a very thin permeable separating layer providing the separation and including pores having diameters adapted to the liquids to be treated.

In industrial filtration devices, the fluid to be treated is transferred into at least one filtration module which generally comprises a plurality of planar or tubular membranes arrayed side-by-side and assembled within an enclosure.

This module comprises at least one inlet for a fluid to be treated, one outlet for the retentate and one outlet for the permeate.

Planar filtration modules are, for example, described in U.S. Pat. No. 4,415,447.

Multi-tube filtration modules are described, for example, in FR-A 2,228,518, U.S. Pat. No. 4,341,631 and EP-A 025,349.

These multi-tube ultrafiltration modules may also be in the form of a perforated monolithic assembly as, for example, described in FR-A 2,585,965 and U.S. Pat. No. 4,069,157.

The modules are situated in a loop providing continuous circulation of the liquid medium to be treated, designated a circulation loop, comprising means (generally a pump) for circulating the fluid. The loop is connected to the inlet and outlet orifices of the module. The loop also comprises an inlet for fresh liquid to be treated and an outlet for concentrated liquid.

The ratio of the inlet flowrate to the outlet rate defines the concentration factor.

A principal drawback of liquid-medium tangential filtration using such a circulation loop is the occurrence, after a certain period of operating time, of at least one phenomenon limiting the effectiveness of the filtration, more fully described below and which is responsible for the "fouling" of the membrane.

As intended herein, "fouling" of the separating layer of the membrane therefore connotes the occurrence of at least one of these phenomena limiting the effectiveness of the filtration. This fouling constitutes the fundamental problem to be solved in respect of tangential filtration, although this type of filtration itself represents a significant improvement in this art. The first limiting phenomenon which is manifested over time is the establishment of an adsorption layer at the surface of the separating layer of the membrane, including the volume within the pores.

The importance of this layer is related to the chemical nature of the membrane, to the fluid to be treated, to its solutes and also to the specific surface area of the membrane. The adsorption will be greater as the pores become narrower and is especially prevalent in ultrafiltration.

The second limiting phenomenon is the actual closing of the pores via blockage by means of particles lodged within the pores which results in a reduction in the number of pores and/or a decrease in their average radius.

This closing of the pores may be prevented by a chemical washing. Such a washing is effective, but it obviously requires the shut-down of the installation and a lengthy and costly handling process.

Only in certain cases is it possible to unplug the pores by simple reversal of the direction of flow of the permeation. However, such a reversal, despite the increase in permeability, results in a loss of time and of permeate, which considerably limits its efficiency.

Another phenomenon exists which limits the efficiency of the filtration and which entails the creation of a deposit of particles at the surface of the separating layer of the membrane.

Indeed, the establishment of a deposit of particles is directly related to the liquid to be filtered and only appears in the event that the liquid to be filtered contains sufficiently large and numerous particles to form such deposit, generally visible to the naked eye. Furthermore, in the instance of solutions, another limiting phenomenon exists entailing the adsorption of all of the precipitated solutes on the membrane, rendered insoluble by reason of the increase in their concentration at the surface of the membrane, by the variations in pH and by the mechanical denaturing of the solutes by the pumps.

A final limiting phenomenon is the polarization layer, the establishment of which is associated with filtration of the solutions. This polarization layer is constituted by an overconcentration of the solute at the surface of the separating layer. It is destroyed by simple diffusion when the effects of convection tend to disappear. Its thickness, which is very small, is on the order of a few micrometers.

As indicated above, the known means for eliminating, at least temporarily, such fouling is chemical washing. In order to reduce the fouling, the known means entail reversing the direction of the permeation as indicated above and increasing the tangential flowrate of fluid to be treated.

Another known means for reducing fouling is to conduct a pulsed flow of the fluid within the module. Thus, V. Millisic et al ["Anti-fouling Technique in Cross-Flow Microfiltration", IVth World Filtration Congress, Ostend, Belgium (April 1986)] pulse a tangential flowrate of liquid by opening and closing a solenoid valve situated along the circulation loop upstream of the module. The pulses thus generated enable the fouling to be substantially reduced.

However, the circulation loop is subjected to significant water pounding, thus initiating a very great pressure increase in the membrane which indeed promotes such "fouling."

It too is known to generate pulses by means of adapted metering pumps or by the agency of a piston mounted in the loop that generates pulses by suction and delivery of a precise volume of liquid. In the case of using such piston, the pulses are in addition to the average flowrate of the loop. On the other hand, in the case of the metering pump, only the flowrate fluctuates about a zero average value.

All of these known means for generating pulses are not adapted to industrial scale systems which employ circulation flowrates on the order of several hundreds of $m^3/h$.

Moreover, these means/devices generate abrupt pressure variations which may damage the membranes and the solute and may promote redepositing the particles previously stripped off from within the pores of the membranes.

SUMMARY OF THE INVENTION

Accordingly, a major object of the present invention is the provision of an improved process/module for the tangential flow filtration of liquid media that conspicuously avoids or ameliorates the "fouling" disadvantages and drawbacks to date characterizing the state of this art, and which comprises a filtration module including at least one membrane filter, a continuous circulation loop for the liquid to be filtered, means for circulating the liquid in the loop and means preventing or greatly limiting the fouling of the membranes by generating a non-steady and periodic state, at least within the membranes.

Another object of the present invention is the provision of such process/module which does not effect pressure variations other than those generated by the circulation of the liquid being subjected to filtration.

Yet another objects of this invention is the provision of such improved process/module wherein, within the module and the loop, a minimum sweep flowrate between each pulse is established and maintained.

Another object of this invention is the provision of a filtration module that operates under conditions of tangential flow which comprises means for generating a non-steady and periodic state of the pseudophysiological type at least within the membranes, adapted for industrial membrane-filtration systems and comprehending circulation flowrates in the loop ranging up to several hundreds of $m^3/h$ and more.

Briefly, the present invention features continuous filtration under conditions of tangential flow and whereby the liquid to be filtered is circulated in a circulation loop which comprises at least one filtration membrane within which a non-steady state is established, such filtration loop comprising means adjusting the flowrate of the liquid and not the pressure thereof, while permitting pseudophysiological flowrates to be generated.

DETAILED DESCRIPTION OF THE PREFERRED EMBODIMENTS OF THE INVENTION

More particularly according to the present invention, the pseudophysiological flowrates are flowrates similar to those existing at the outlet of the human heart.

Indeed, it has been demonstrated according to the present invention that establishing pseudophysiological flowrates over the membranes continuously supplied by a tangential-flow filtration circulation loop virtually eliminates or greatly reduces any fouling. The process and the apparatus of the invention are useful for all filtration operations including, more particularly, microfiltration, ultrafiltration and reverse osmosis. The present invention is especially useful for microfiltration and ultrafiltration employing tubular membrane modules.

Figure 1:
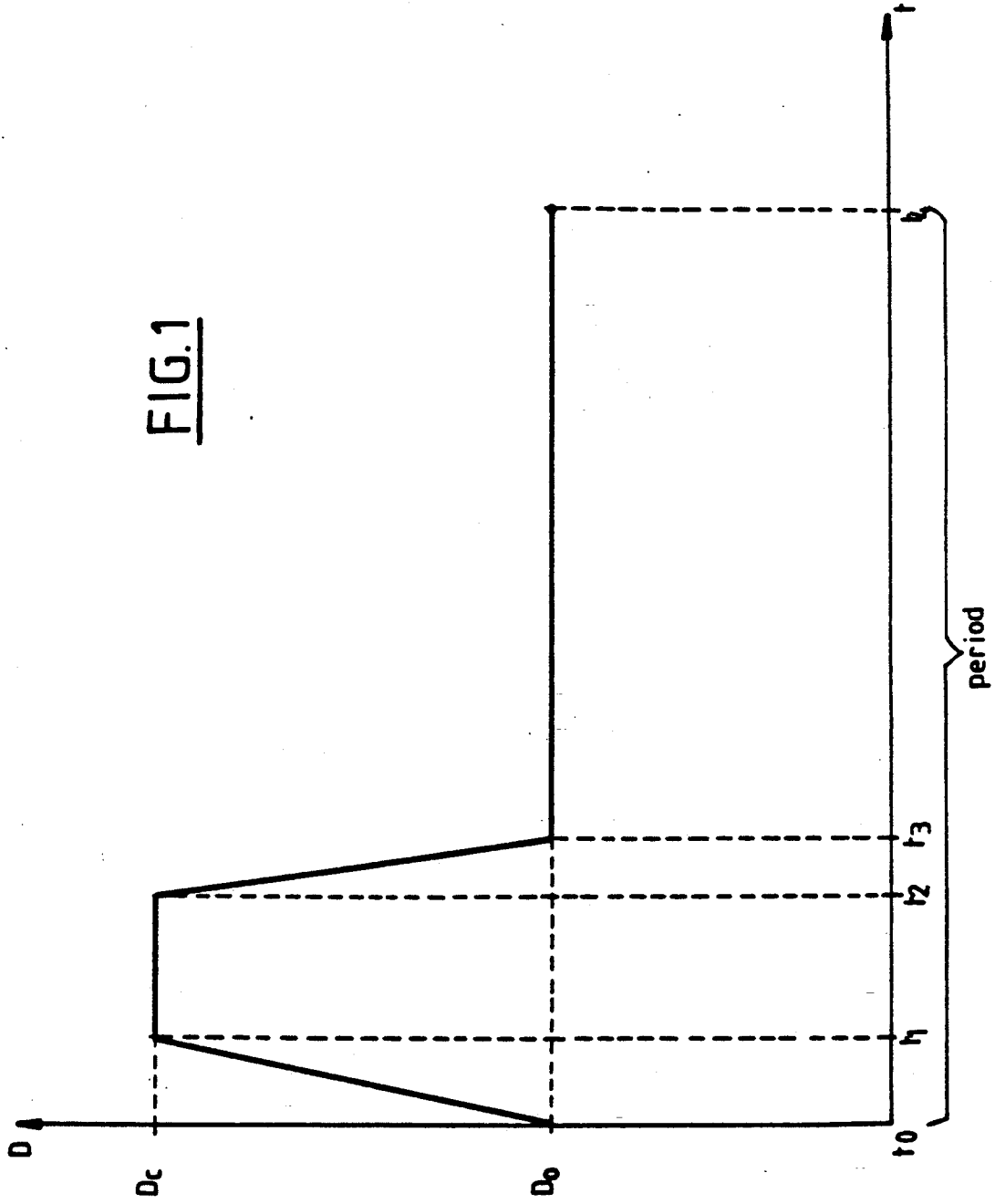
FIG. 1 is a graph illustrating the profile of a pseudophysiological flowrate.

Referring specifically to the Figures of Drawing, the profile of a pseudophysiological flowrate is shown in FIG. 1.

The flowrate D is the ordinate and the time t is the abscissa. The interval between $t_0$ and $t_4$ represents a period T.

As shown in FIG. 1, from a minimum sweep flowrate $D_0$, the flowrate increases rapidly between $t_0$ and $t_1$ followed by a maintenance period between $t_1$ and $t_2$ where the peak flowrate $D_c$ attained and a decrease until, at $t_3$, the minimum sweep flowrate $D_0$ is resumed.

The pressure exerted on the loop is preferably less than the saturation threshold of the membranes.

The means according to the invention therefore permits the flowrate to be rapidly increased in the membrane without pressure variation within the membrane, other than that associated with flowrate variations.

Moreover, at the beginning of the period of the transport of the fluid in the membrane, a pulse is generated constituted by a phase of rapid flowrate increase, then a plateau and a decrease; the duration of this pulse is a fraction of the period which is different from ½. The preferred fractions range from 0.05 to 0.4. Indeed, the smaller fractions permit the size of the pumps to be reduced.

The use of pseudophysiological flowrates in the subject tangential-flow filtration permits fouling to be prevented or at the very least greatly reduced. In addition, the flow of permeate may be substantially constant while, in the steady state, according to the known processes, the flow of permeate decreases and the quality of the filtration varies over time.

The means enabling pseudophysiological flowrates to be generated may be selected, especially, from among an adapted metering pump, a cardiac pump and a rotating-disc system located just upstream or just downstream of the filtration module.

An exemplary metering pump which can be used is, in particular, described in *Innov. Tech. Biol. Med.*, Vol. 4, No. 1, pages 33-45 (1983); *Medical and Biological Engineering & Computing*, pages 511-516 (November 1985); *J. Physiol, Paris*, 73, pages 977—1004 (1977); and *Med. Progr. Technol.*, No. 6, pages 39-40 (1978).

The cardiac pumps are described in numerous publications and patents.

Although the metering pump described in the above references and the cardiac pumps give very good results, these two particular means for generating pseudophysiological flowrates are insufficient for treating circulation flowrates in the loop ranging up to several hundreds of m$^3$/h and, in addition, they do not enable the non-steady state to be localized at the single membranes.

In order to solve this problem, the present invention provides a filtration module and a tangential flow comprising a plurality of membranes and, as the particular means generating a non-steady and periodic state of pseudophysiological type in the single membranes, a rotating disc, suitably perforated and disposed downstream or upstream of the module at a suitable distance from the inlet or from the outlet of the module.

Figure 2:
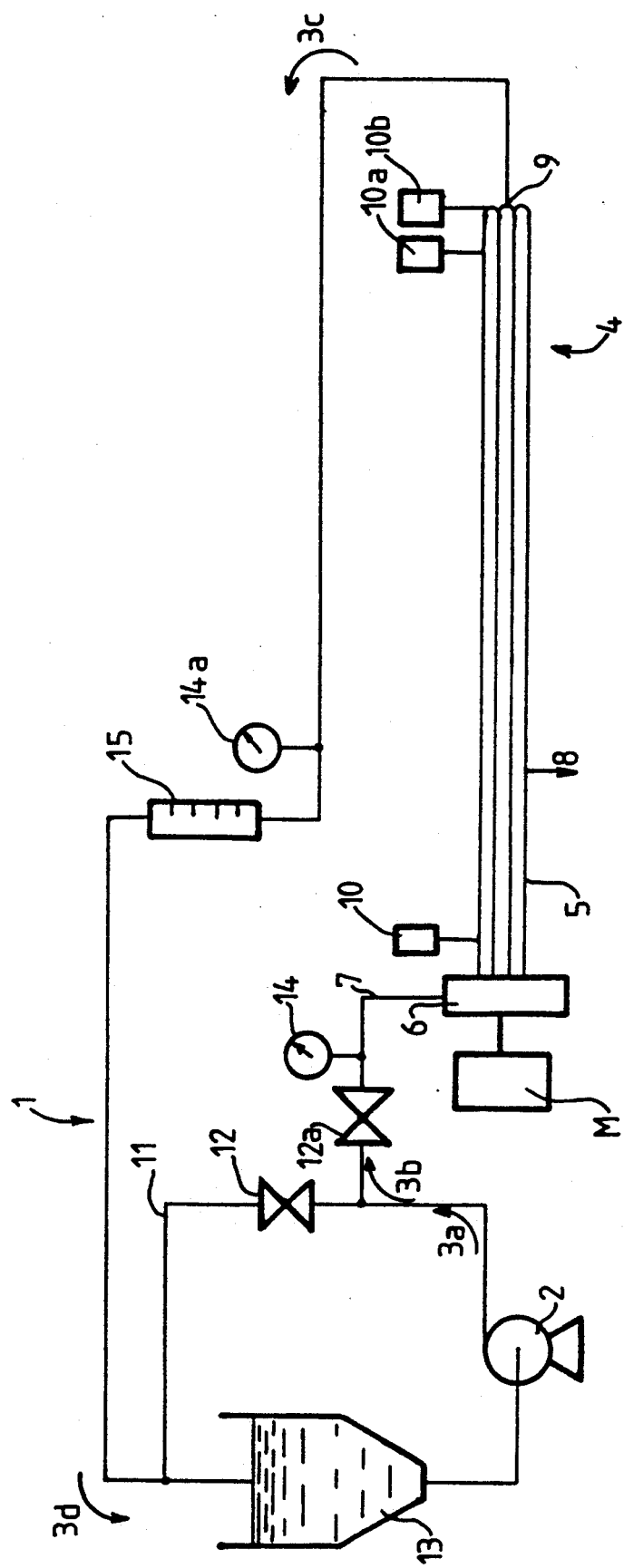
FIG. 2 is a schematic/diagrammatic illustration of a circulating filtration loop according to the present invention operating under conditions of non-steady tangential flow.

In FIG. 2, a loop 1 for circulation of fluid to be treated is shown diagrammatically, the circulation of the fluid in which is induced by a pump 2 in the direction of the arrows 3a, 3b, 3c and 3d.

The circulation loop is provided with an ultrafiltration module 4 comprising a bundle of tubular membranes, not shown in this figure, and disposed side-by-side inside a leaktight enclosure 5.

Upstream from the module 4 is fixed a rotating disc, now shown, housed in a leaktight casing 6 integral with the enclosure 5, the disc being actuated by the motor M.

The module comprises an inlet 7 for the fluid to be treated entering into the casing 6, an outlet for permeate 8 and an outlet for retentate 9.

In order to measure the flowrate and the upstream and downstream pressures within a membrane, two pressure sensors 10 and 10a and a flow meter 10b are disposed on one of the 5 membranes of the filtration module 4.

The filtration loop 1 comprises a shunt circuit (bypass) 11 of the fluid to be treated, isolated by the valves 12 and 12a, a vessel 13 for retaining the fluid to be treated, two manometers 14 and 14a and a flow meter 15.

Figure 3:
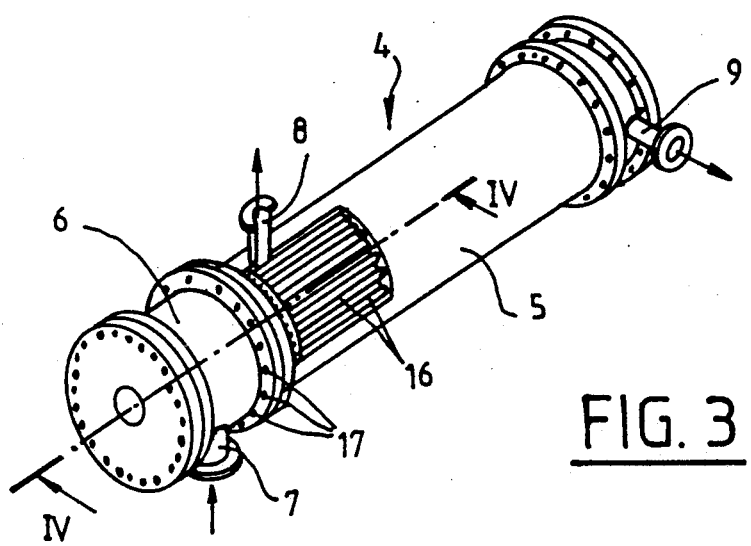
FIG. 3 is a plan view, partially broken away to show detail, of a tubular ultrafiltration module according to the invention, provided with a rotating disc distributor.

In FIG. 3 the filtration module 4 comprises a leaktight enclosure 5 in which are housed a bundle to ultrafiltration tubular membranes 16 disposed side-by-side.

Figure 4:
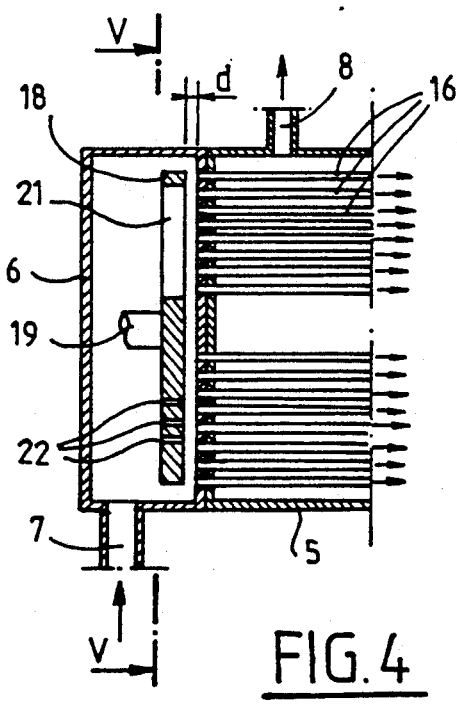
FIG. 4 is a cross-sectional view along the axis IV—IV of FIG. 3.
Figure 5:
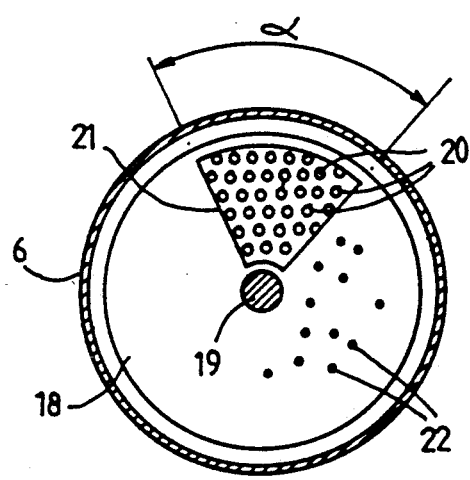
FIG. 5 is a front view along the axis V—V of FIG. 4.

The module 4 comprises an outlet for permeate 8 and an outlet for retentate 9. Upstream of the module 4 is fixed, by bolts 17, a casing 6 provided with an inlet 7 for the fluid to be treated. On the inside of the casing 6 is a disc 18 rotating about an axis 19 parallel to the axis of the membranes 16 and actuated by a motor M, now shown, (FIG. 4).

The rotating disc 18 is perpendicular to the membranes and faces the inlet orifices 20 of the membranes. A portion 21 of the disc is open in such manner that, during one complete rotation of the disc, the totality of the inlet orifices 20 of the membranes is visible through the open portion 21 of the disc. Moreover, the non-open portion of the disc is provided with perforations 22 preferably uniformly distributed in the non-open portion of the disc. Furthermore, it is recommended that the diameter of the perforations be less than the diameter of the inlet orifice of the membranes, preferably in a ratio of at least ¼. Also, the number of the perforations of the non-open portion of the disc is preferably at least equal to the number of the orifices of the membranes, which orifices are concealed by this non-open portion.

Preferably, the open area of the disc is constituted by at least one sector of the disc characterized by its angle $\alpha$.

In one embodiment of the invention, the rotating disc 18 may be driven by the flow of the liquid to be treated by means of a turbine located upstream of the disc.

In a preferred embodiment of the invention, the distance (d) between the disc 18 and the inlet orifices 20 of the membranes is adjustable and the filtration modules are ultrafiltration modules as, for example, those described in the above patents FR-A-2,228,528, U.S. Pat. No. 4,341,631 and EP-A-0,025,349.

When the loop 1 is in operation, the flow of liquid to be treated is transported through the open portion 21 and the perforations 22 of the rotating disc 18; the disc 18 rotates at a speed determined by the motor M (or the turbine). This speed of the rotating disc defines the duration of the period T of the non-steady flowrate within the membranes. The variation of the flowrate is similar to that shown in FIG. 1.

The maximum flow of liquid (peak flowrate $D_c$) only circulates in a certain number of membranes during a given period of time. The value of the angle $\alpha$ of the open sector of the rotating disc is therefore directly related to the duration of the peak flowrate $D_c$.

Moreover, the number of perforations 22 of the rotating disc, the diameter of these perforations and the distance separating the rotating disc from the inlet orifices 20 of the membranes, define the minimum sweep flowrate $D_c$. It will be appreciated that as d increases, so also the number of perforations and their diameter become larger and $D_c$ increases until becoming equal to the flowrate generated by the pump 2. Then, there no longer exists a pseudophysiological flowrate.

The perforations are desirable in the case where the diameter of the disc is large.

By virtue of the open portion of the rotating disc, the maximum flow of liquid only traverses a certain number of membranes during a given period of time. Of course, the profile of the flowrate shown in FIG. 1 depends on the geometry of the perforations 22, on the angle $\alpha$ which subtends the sector of the open portion, on the speed of rotation of the rotating disc 18 and on the distance d between the disc and the perforations 22.

The following relates to examples of operation of the circulation loop shown diagrammatically in FIG. 2.

Figure 6:
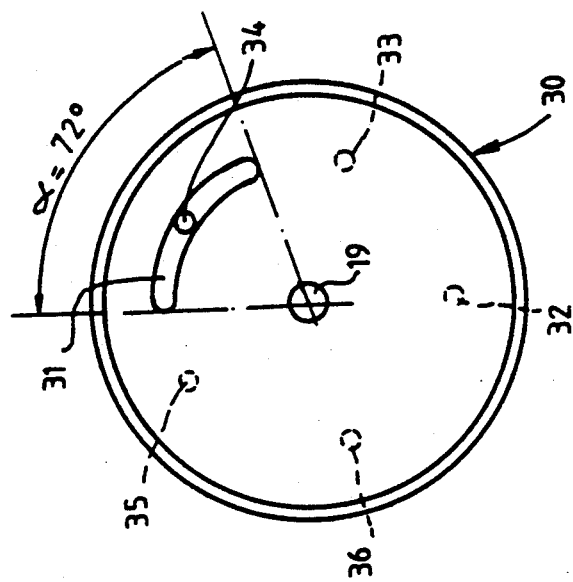
FIG. 6 is a front view of the rotating disc distributor associated with the filtration module used in the following specific examples of the invention.

The filtration module comprises 5 membranes and tests have been carried out using the rotating disc shown in FIG. 6.

In FIG. 6, it will be seen that the rotating disc 30 comprises a slot 31 whose width is substantially equal to the diameter of the orifices 32, 33, 34, 35 and 36 of the 5 membranes. The angle $\alpha$ of the sector is 72°. As shown in FIG. 6, it will therefore be seen that when the disc rotates, the slot 31 is always facing an orifice of one membrane and one alone.

The membranes have an internal diameter of 6 mm, an external diameter of 10 mm and a length of 1,200 mm. Either type of membrane, as described hereinbelow, is used:

(i) the first type of membrane is designated an ultrafiltration membrane whose cut-off capacity is 50,000 daltons.

(ii) the second type of membrane is a microfiltration membrane whose pore diameter is 0.14 μm.

The disc 30 is driven by the motor M at the speed of 60 revolutions/min.

The flowrate Q in the circulation loop is provided by a regulated metering pump 2 which enables flowrates varying from 500 to 2,500 l/h to be obtained.

In order to further illustrate the present invention and the advantages thereof, the following specific examples are given, it being understood that same are intended only as illustrative and in nowise limitative.

EXAMPLE 1

In this example, the 5 membranes of the filtration module were of the ultrafiltration type such as described above. The retention vessel 13 was initially filled with water. The valve 12 was closed and the valve 12a was open. The motor M was started. The pump 2 was adjusted for a flowrate Q of 1000 l/h. This pump 2 was started. The flowrate Q was monitored on the flow meter 15.

With the aid of the valve 12, the pressure indicated on the monometer 14 was then adjusted to 1.5 bar. The pressure drop of the disc/membrane/pipework assembly was determined by the difference between the values of the pressures indicated on the monometers 14 and 14a.

Figure 7A:
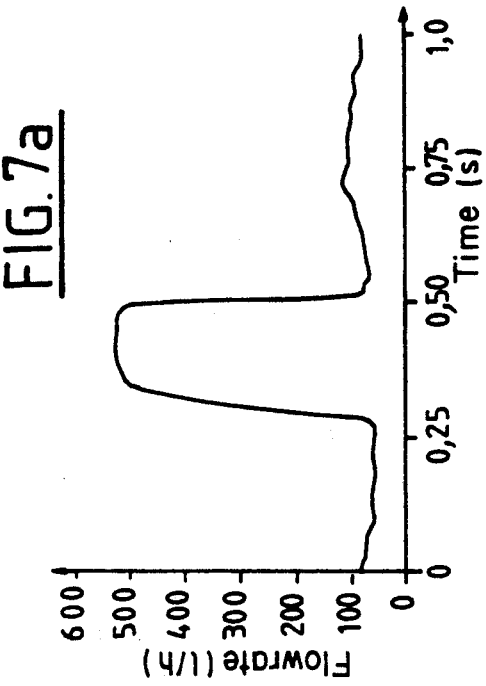
FIGS. 7a and 7b are graphs respectively plotting, over a given period of time, the flowrates within a membrane and the pressures at the inlet, Pe, and at the outlet, Ps, of a membrane, attained in the Example 1 which follows.

The flow meter 10b measuring the flowrate within a membrane indicated that pseudophysiological flowrates as shown in FIG. 7a was obtained correctly.

In this Figure, it was observed that, for a period T of 1 s, the flowrate pulse, the total duration of which was approximately 0.2 s, comprised a rapid-increase phase in which the flowrate increased very rapidly from approximately 100 l/h (base flowrate) to approximately 500 l/h (peak flowrate) followed by a phase maintaining the peak flowrate for slightly less than 0.2 s, followed by a decreasing phase until the base flowrate of approximately 100 l/h was resumed.

With the aid of pressure sensors 10 and 10a, the pressure variations at the inlet, Pe, and at the outlet, Ps, of one membrane were measured during a time period T. These pressure variations are shown in FIG. 7b.

Figure 7B:
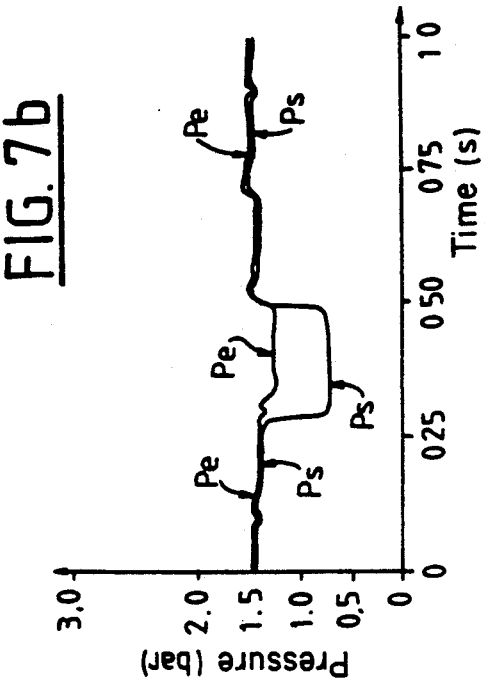

This FIG. 7b shows the pressure Pe at the inlet of a membrane, which was substantially constant throughout the period and the outlet pressure Ps which decreased from the beginning of the flowrate pulse until resuming its initial value at the end of this pulse. The pressure drop was 0.7 bar. This clearly illustrates that the pressure variations within the membrane are only a consequence of the flowrate variations. It was also noted that the pressures Pe and Ps at the inlet and at the outlet of a membrane were substantially identical during one period except during the flowrate pulse.

The water flowrate at the outlet 8 of the permeate was 7.30 l/h. This flowrate represents the maximum value of aqueous permeate which may be obtained by the membrane.

This example based on water demonstrates the efficiency of the filtration module provided with the rotating disc.

EXAMPLE 2

The procedure of Example 1 was repeated, except that the water was replaced by a 10 g/l bentonite suspension and that the outlet 8 for the permeate discharged into the retention vessel 13 in order to prevent any bentonite-concentration variation during the 3 h of the test. The average flowrate of permeate Dp, which was 1.48 l/h, was also measured. The flowrate variations within the membrane and of the inlet/outlet pressures, Pe/Ps, were substantially identical to those obtained in Example 1. The base flowrate was 104 l/h and the peak flowrate was 550 l/h.

EXAMPLE 2a (COMPARATIVE)

The procedure of Example 2 was repeated, except that the filtration module was provided with new membranes and did not comprise a rotating disc. Each membrane was swept by a steady flowrate of 200 l/h for a pressure drop of 0.15 bar. After 3 h of test, the average flowrate of permeate was 0.74 l/h, namely, two times less than in Example 2.

The pseudophysiological flowrate therefore enabled the fouling to be greatly reduced without thereby, in this specific case, eliminating it, since the maximum value of permeate which may be obtained was 7.30 l/h (Example 1).

EXAMPLE 3

The procedure of Example 1 was repeated, except that the membranes used were of the microfiltration type as described above. The flowrate of permeate from the membrane was 13.34 l/h, the pressure drop was 0.52 bar, the base flowrate was 104 l/h for a peak flowrate of 550 l/h.

EXAMPLE 4

The procedure of Example 2 was repeated, but with the microfiltration membranes of Example 3. It was found that:

| | |
|---|---|
| Flowrate of permeate = | 1.96 l/h |
| Pressure drop = | 0.52 bar |
| Base flowrate | 104 l/h |
| Peak flowrate | 550 l/h |

EXAMPLE 4a (COMPARATIVE)

The procedure of Example 4 was repeated, except that new membranes were used and the disc was removed. The results obtained were the following:

| | |
|---|---|
| Steady flowrate | 206 l/h |
| Pressure drop | 0.15 bar |
| Flowrate of permeate | 0.67 l/h |

The flowrate of permeate was therefore three times less than in Example 3.

In Examples 1 to 4a, a comparison was made, for the microfiltration of bentonite, between the influence of the pseudophysiological states on the fouling of ultrafiltration and microfiltration membranes. It was determined that the pseudophysiological states were more efficient in the case of microfiltration membranes, as the latter were fouled more easily than the ultrafiltration membranes during the separation of bentonite.

While the invention has been described in terms of various preferred embodiments, the skilled artisan will appreciate that various modifications, substitutions, omissions, and changes may be made without departing from the spirit thereof. Accordingly, it is intended that

What is claimed is:

1. A process for the continuous filtration of a filterable liquid medium, comprising circulating said filterable liquid medium at an established flowrate and driving pressure in a circulation loop and tangentially through a filtration module provided therealong which comprises at least one filtration membrane having operative face surfaces and a permeate outlet, and adjusting the flowrate but not the driving pressure of said circulating liquid medium so as to establish a non-steady periodic pseudophysiological and unevenly distributed flow approaching said at least one membrane and, at least over the operative face surfaces of said at least one filtration membrane.

2. The process as defined by claim 1, comprising adjusting said flowrate to be cyclical through the surfaces of said at least one membrane so as to first generate a minimum flowrate $D_0$, next a pulse phase of rapid flowrate increase, next a plateau of peak flowrate $D_c$ and then a return to the flowrate $D_0$.

3. The process as defined by claim 2, wherein the duration of said pulse phase ranges from 0.05 to 0.4 times the total period of adjustment time.

4. The process as defined by claim 1, comprising adjusting said flowrate by means of a metering or cardiac pump.

5. The process as defined by claim 1, comprising adjusting said flowrate by distributing said flowrate through a rotating, apertured and perforated disc.

6. An apparatus for the continuous filtration of a filterable liquid medium, comprising a liquid medium circulation loop, a filtration module operably provided therealong including a permeate outlet and at lest one filtration membrane having operative face surface, means for driving a filterable liquid medium at a desired flowrate and driving pressure, so as to traverse said circulation loop and tangentially flow through said filtration module, and means for adjusting the flowrate but not the driving pressure of said circulating liquid medium so as to establish a non-steady periodic pseudophysiological and unevenly distributed flow approaching said at least one membrane and, at least over the operative face surfaces of said at least one membrane.

7. A filtration module for the continuous filtration of a filterable liquid medium having means to provide a desired flowrate and driving pressure, comprising (i) at least one inlet opening for a filterable liquid medium, at least one retentate outlet opening and at least one permeate outlet opening, (ii) at least one filtration membrane having operative face surfaces operably housed therein, and (iii) means for adjusting the inlet flowrate but not the driving pressure o filterable liquid medium introduced therein so as to establish a non-steady periodic pseudophysiological and unevenly distributed flow approaching said at least one membrane and, at least over the operative face surfaces of said at least one membrane.

8. The filtration module as defined by claim 7, said means for adjusting the flowrate of said filterable liquid medium comprising a rotatable distributor disc, having an aperture and perforations therein, perpendicularly disposed to said at least one filtration membrane and spaced either upstream or downstream therefrom.

9. The filtration module as defined by claim 8, said at least one filtration membrane comprising a bundle of tubular membranes.

10. The filtration module as defined by claim 9, said distributor disc having a geometry such that, upon one complete revolution thereof, the totality of the openings of said tubular membranes are exposed through the aperture and perforations thereof.

11. The filtration module as defined by claim 10, comprising an aperture opening circumscribing at least one portion of said rotatable disc exposing openings of said tubular membranes and another portion of said rotatable disc screening openings of said tubular membranes.

12. The filtration module as defined by claim 11, said rotatable disc comprising a plurality of perforations at least equal to the number of openings of the tubular membranes screened by the unapertured area thereof.

13. The filtration module as defined by claim 12, the diameters of said perforations being less than the diameters of the openings of the tubular membranes.

14. The filtration module as defined by claim 8, said rotatable disc being adjustably spaced from said at least one filtration membrane.

15. A filtration module for the continuous filtration of a filterable liquid medium having means to provide a desired flowrate and driving pressure comprising (i) at least one inlet opening for a filterable liquid medium, at least one retentate outlet opening and at least one permeate outlet opening, (ii) more than ne filtration membrane having operative face surfaces operably housed therein, and (iii) a rotatable distributor disc, having an aperture and perforations therein, perpendicularly disposed to said filtration membranes and spaced either upstream or downstream therefrom, said disc being configured and arranged to adjust the flowrate but not the driving pressure through said membranes so as to established a non-steady periodic pseudophysiological flow, wherein the flowrate continuously varies between said membranes.

* * * * *